US011556896B2

(12) United States Patent
Chen et al.

(10) Patent No.: US 11,556,896 B2
(45) Date of Patent: Jan. 17, 2023

(54) EMPLOYMENT RECRUITMENT METHOD BASED ON FACE RECOGNITION AND TERMINAL DEVICE USING SAME

(71) Applicant: Fulian Precision Electronics (Tianjin) Co., LTD., Tianjin (CN)

(72) Inventors: Po-Cheng Chen, New Taipei (TW); Ting-Yu Du, New Taipei (TW); Shih-Yin Tseng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 598 days.

(21) Appl. No.: 16/716,826

(22) Filed: Dec. 17, 2019

(65) Prior Publication Data

US 2021/0097494 A1 Apr. 1, 2021

(30) Foreign Application Priority Data

Sep. 26, 2019 (CN) .......................... 201910920147.5

(51) Int. Cl.
*G06Q 10/10* (2012.01)
*G06F 40/30* (2020.01)
(Continued)

(52) U.S. Cl.
CPC ....... *G06Q 10/1053* (2013.01); *G06F 16/951* (2019.01); *G06F 16/953* (2019.01);
(Continued)

(58) Field of Classification Search
None
See application file for complete search history.

(56) References Cited

U.S. PATENT DOCUMENTS

2016/0224869 A1* 8/2016 Clark-Polner ....... G06K 9/6254
2018/0025303 A1* 1/2018 Janz ....................... G16H 50/20
705/2
(Continued)

FOREIGN PATENT DOCUMENTS

CN 104881847 9/2015
CN 108595491 9/2018
(Continued)

OTHER PUBLICATIONS

H. Suen, K. Hung and C. Lin, "TensorFlow-Based Automatic Personality Recognition Used in Asynchronous Video Interviews," in IEEE Access, vol. 7, pp. 61018-61023, 2019, doi: 10.1109/ACCESS.2019.2902863. (Year: 2019).*
(Continued)

*Primary Examiner* — Laura Yesildag
(74) *Attorney, Agent, or Firm* — ScienBiziP, P.C.

(57) ABSTRACT

An employment recruitment method based on face recognition includes acquiring a candidate's data from a third-party website, analyzing the candidate's data by a semantic analysis method to identify human resources information of the candidate, and analyzing messages and postings in the human resources information of the candidate to determine candidate's personality. A terminal device acquires a second face image of the candidate by a second camera, analyzes the second face image of the candidate by a computer vision algorithm to determine a micro-expression of the candidate, and provides the candidate's human resources information, the candidate's personality, and the candidate's micro-expression to the recruiter to evaluate the candidate. The terminal device applying the method is also disclosed.

15 Claims, 4 Drawing Sheets

(51) Int. Cl.
*G06F 16/953* (2019.01)
*G06F 16/951* (2019.01)
*G06V 40/16* (2022.01)
*G06F 21/32* (2013.01)

(52) U.S. Cl.
CPC .............. *G06F 21/32* (2013.01); *G06F 40/30* (2020.01); *G06V 40/174* (2022.01); *G06V 40/176* (2022.01)

(56) References Cited

U.S. PATENT DOCUMENTS

| | | | | |
|---|---|---|---|---|
| 2020/0042685 | A1* | 2/2020 | Tussy | G06F 21/32 |
| 2020/0143329 | A1* | 5/2020 | Gamaliel | H04N 21/45455 |
| 2021/0279668 | A1* | 9/2021 | Mikhajlov | G06F 21/32 |

FOREIGN PATENT DOCUMENTS

| | | |
|---|---|---|
| CN | 109658533 | 4/2019 |
| TW | 201807602 | 3/2018 |
| TW | 201907329 | 2/2019 |

OTHER PUBLICATIONS

J. Gorbova, I. Lüsi, A. Litvin and G. Anbarjafari, "Automated Screening of Job Candidate Based on Multimodal Video Processing," 2017 IEEE Conference on Computer Vision and Pattern Recognition Workshops (CVPRW), 2017, pp. 1679-1685, doi: 10.1109/CVPRW.2017.214. (Year: 2017).*

D. Y. Liliana and T. Basaruddin, "Review of Automatic Emotion Recognition Through Facial Expression Analysis," 2018 International Conference on Electrical Engineering and Computer Science (ICECOS), 2018, pp. 231-236, doi: 10.1109/ICECOS.2018.8605222. (Year: 2018).*

V. M. Menon and H. A. Rahulnath, "A novel approach to evaluate and rank candidates in a recruitment process by estimating emotional intelligence through social media data," 2016 International Conference on Next Generation Intelligent Systems (ICNGIS), 2016, pp. 1-6, doi: 10.1109/ICNGIS.2016.7854061. (Year: 2016).*

* cited by examiner

EMPLOYMENT RECRUITMENT METHOD BASED ON FACE RECOGNITION AND TERMINAL DEVICE USING SAME

CROSS-REFERENCE TO RELATED APPLICATIONS

This application claims priority to Chinese Patent Application No. 201910920147.5 filed on Sep. 26, 2019, the contents of which are incorporated by reference herein.

FIELD

The subject matter herein generally relates to face recognition field, especially to an employment recruitment method based on face recognition and a terminal device using the same.

BACKGROUND

In prior recruitment system, an authentication mechanism for protecting personal privacy and an authentication mechanism for allowing people's access to an enterprise are independent and incompatible, complicating the process of employment recruitment.

BRIEF DESCRIPTION OF THE DRAWINGS

Implementations of the present disclosure will now be described, by way of example only, with reference to the attached figures.

DETAILED DESCRIPTION

Figure 1:
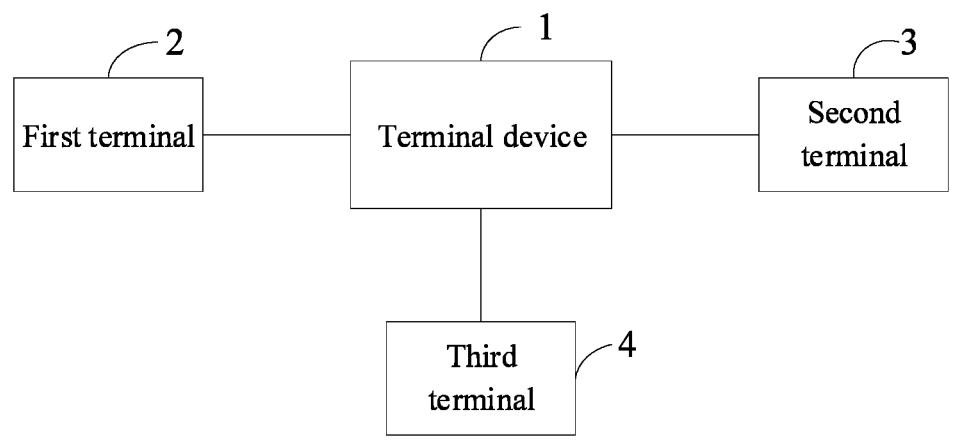
FIG. 1 is a block diagram of one embodiment of a running environment of an employment recruitment method based on face recognition.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of an employment recruitment method based on face recognition. The method is applicable in a terminal device 1. The terminal device 1 communicates with a first terminal 2, a second terminal 3, and a third terminal 4 by a network. In one embodiment, the network can be a wired network or a wireless network. For example, the network can be WI-FI, a cellular network, a satellite network, a broadcast network. In one embodiment, the terminal device 1 can be a single server, a server group, or a cloud server. In one embodiment, the first terminal 2 is used by a candidate for employment, the second terminal 3 is used by a security station at entrance of employer, the third terminal 4 is used by a recruiter or an employer. In one embodiment, the first terminal 2, the second terminal 3, and the third terminal 4 can have a same structure, or different structures. In one embodiment, the first terminal 2, the second terminal 3, and the third terminal 4 can be laptops, desktops, tablets, or smartphones.

Figure 2:
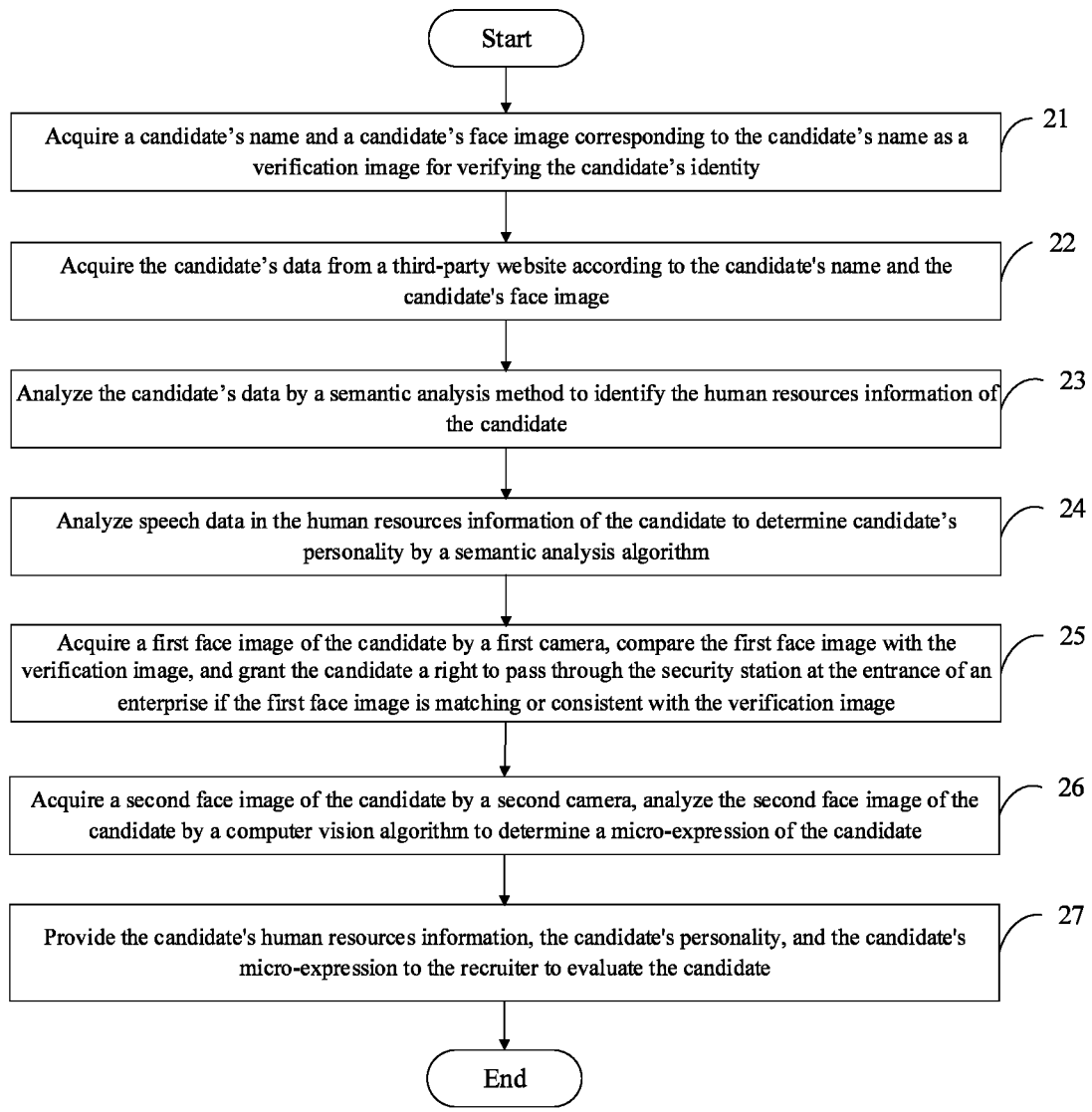
FIG. 2 is a flowchart of one embodiment of the employment recruitment method of FIG. 1.

FIG. 2 illustrates a flowchart of the employment recruitment method based on face recognition. The employment recruitment method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 21.

At block 21, the terminal device 1 acquires a candidate's name and a candidate's face image corresponding to the candidate's name as a verification image for verifying the candidate's identity.

In one embodiment, the terminal device 1 acquires the verification image through an employment recruitment website by which the candidate uploads the verification image. In one embodiment, the candidate logs on the employment recruitment website by the first terminal device 1, fills in a registration application to apply for a registration account, and is given an access to the employment recruitment website by the registration account. The employment recruitment website receives a face image of the candidate uploaded by the candidate, and determines whether the face image is eligible, and can determine whether the eligible face image can be used as the verification image. In one embodiment, the registration information of the candidate includes the candidate's name, and the terminal device 1 acquires the candidate's name from the registration information of the candidate. In one embodiment, the first terminal 2 uploads the candidate's face image to the employment recruitment website through an uploading interface on the employment recruitment website. In detail, the first terminal 2 acquires the candidate's face image by a camera or from an external device, and uploads the candidate's face image to the employment recruitment website through the uploading interface on the employment recruitment website.

In one embodiment, the determination by the terminal device 1 as to whether the face image is eligible, and allowing the eligible face image to be used as the verification image includes detecting whether a proportion of the face in the face image occupying a total area of the face image reaches a preset proportional value, detecting whether a clarity of the face image reaches a preset clarity, detecting whether a brightness of the face image reaches a preset brightness, detecting whether a face angle in the face image is face-on or tilted, detecting whether a face in the face image is smiling, and detecting whether eyes in the face image are closed. The face image can be determined as the verification image when the proportion of the face in the face image occupying the total area of the face image reaches the preset proportional value, and/or when the clarity of the face image reaches the preset clarity, and/or when the brightness of the face image reaches the preset brightness, and/or when the face angle in the face image is face-on and in full view rather than tilted away, and/or when the face in the face image is smiling, and/or when the eyes in the face image are closed. In this embodiment, in the detection of whether the clarity of the face image reaches the preset clarity, the face image can be transformed by a Fourier Transform to obtain a high-frequency component of the face image, which is used to determine whether the clarity of the face image reached the preset clarity. In one embodiment, the terminal device 1 determines the eligible face image to be used as the verification image and stores the verification image.

At block 22, the terminal device 1 acquires the candidate's data from a third-party web site according to the candidate's name and the candidate's face image.

In one embodiment, the terminal device 1 queries a third-party website according to the candidate's name and the candidate's face image, and acquires the candidate's data by visiting an API interface of the third-party website. In one embodiment, the third-party website may be a social networking site or a corporate human resources site, for example, the social networking site may be WECHAT, or FACEBOOK, and the corporate human resources sites may be a banking, or other corporate human resources website. In another embodiment, the terminal device 1 queries the third-party website according to the candidate's name and the candidate's face image, and acquires the candidate's data by a network crawler.

At block 23, the terminal device 1 analyzes the candidate's data by a semantic analysis method to identify the human resources information of the candidate.

In one embodiment, the terminal device 1 matches the candidate's data with a local thesaurus, and splits the candidate's data according to the matching results, and identify the human resources information of the candidate according to the splitting of the candidate's data. In one embodiment, the local thesaurus includes a number of terms related to the candidate's data. The terms includes, but is not limited to, common words collected from the Internet to describe human resources information, and common words used to describe human resources information obtained from the user's message history on the Internet. In one embodiment, the terminal device 1 splits the candidate's data from the first word of the candidate's data to the end word of the candidate's data to determine a number of phrases formed by one or more words of the candidate's data, determines whether the phrases match with the terms of the local thesaurus, determines the phrases which match with terms of the local thesaurus as the human resources information of the candidate. In one embodiment, the human resources information of the candidate includes candidate's resume and postings. In one embodiment, the terminal device 1 displays the human resources information of the candidate on the employment recruitment website for the candidate to confirm and modify the human resources information.

At block 24, the terminal device 1 analyzes speech data in the human resources information of the candidate to determine candidate's personality by a semantic analysis algorithm.

In one embodiment, the terminal device 1 analyze the speech data in the human resources information of the candidate to determine candidate's personality by a linear regression algorithm or a decision tree algorithm.

At block 25, the terminal device 1 acquires a first face image of the candidate by a first camera, compares the first face image with the verification image, and grants the candidate a right to pass through the security station at the entrance of an enterprise if the first face image is matching or consistent with the verification image.

In one embodiment, the first camera is set on the second terminal 3. The terminal device 1 acquires the first face image of the candidate from the first camera of the second terminal 3, compares the first face image with the verification image, and grants the candidate the right to pass through the entrance of the enterprise corresponding to the recruiter when the first face image is consistent with the verification image. Thereby, an authentication mechanism for protecting personal privacy and an authentication mechanism for allowing people to access the enterprise are compatible, simplifying the process of employment recruitment.

At block 26, the terminal device 1 acquires a second face image of the candidate by a second camera, analyzes the second face image of the candidate by a computer vision algorithm to determine a micro-expression of the candidate.

In one embodiment, the second camera is set on the third terminal 4, and the terminal device 1 acquires the second face image of the candidate from the second camera of the third terminal 4. In one embodiment, the terminal device 1 captures a face portion of the second face image by the computer vision algorithm, indicates key points in the face portion, and determines a change of the micro-expression of the candidate by the key points in the face portion. The micro-expression of the candidate is determined according to changes of the micro-expressions of the candidate. In one embodiment, the computer vision algorithm can be a linear discrimination analysis algorithm, an independent component analysis algorithm, or a hidden Markov algorithm.

At block 27, the terminal device 1 provides the candidate's human resources information, the candidate's personality, and the candidate's micro-expression to the recruiter to evaluate the candidate.

In one embodiment, the terminal device 1 analyzes the candidate's images in the candidate's data to get a candidate's behavioral analysis result, and provides the candidate's behavioral analysis result to the recruiter. For example, the terminal device 1 analyzes the candidate's images in the candidate's data by the computer visual algorithm to determine whether the candidate may be an alcoholic, a drug user, or a person with abnormal behaviors, and provides the results to the recruiter.

Figure 3:
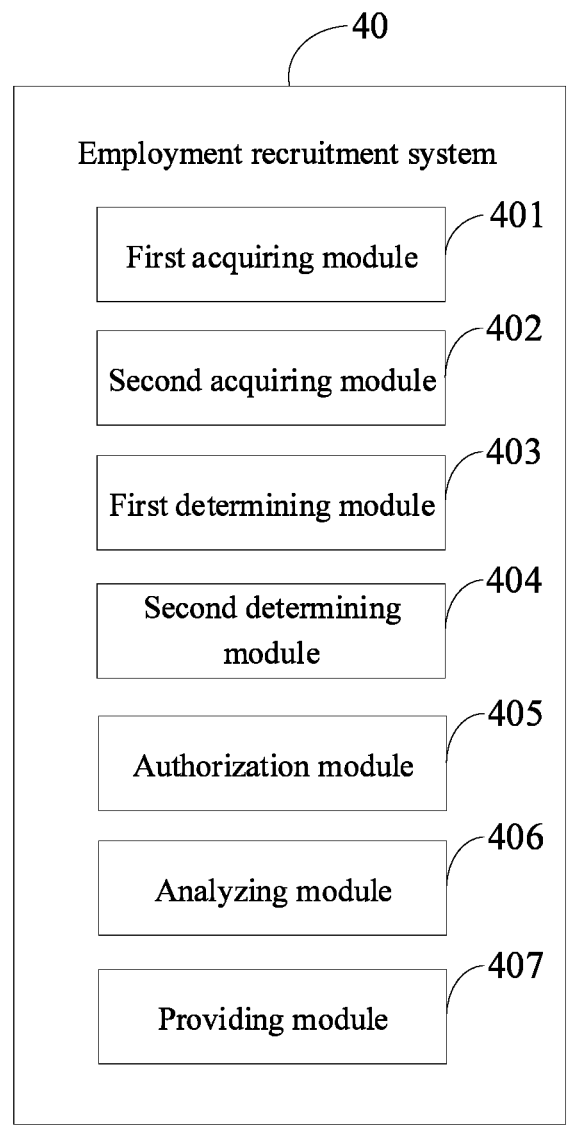
FIG. 3 is a block diagram of one embodiment of an employment recruitment system based on face recognition.

FIG. 3 illustrates an employment recruitment system 40 based on face recognition. In at least one exemplary embodiment, according to the functions it performs, the employment recruitment system 40 can be divided into a plurality of functional modules. The plurality of functional modules perform steps in blocks 21-27 in the embodiment of FIGS. 1-2. The employment recruitment system 40 includes, but is not limited to, a first acquiring module 401, a second acquiring module 402, a first determining module 403, a second determining module 404, an authorization module 405, an analyzing module 406, and a providing module 407. The modules 401-407 of the employment recruitment system 40 can be collections of software instructions, stored and executed by the terminal device 1.

The first acquiring module 401 acquires a candidate's name and a candidate's face image corresponding to the candidate's name as a verification image for verifying the candidate's identity.

In one embodiment, the first acquiring module 401 acquires the verification image through an employment recruitment web site by which the candidate uploads the verification image. In one embodiment, the candidate logs on the employment recruitment website by the first terminal 2 1, fills in a registration application to apply for a registration account, and have access to the employment recruitment website by the registration account. The employment recruitment website receives a face image of the candidate uploaded by the candidate, and determines whether the face image is eligible, and determines whether the eligible face image can be used as the verification image. In one embodiment, the registration information of the candidate includes the candidate's name, and the first acquiring module 401 acquires the candidate's name from the registration information of the candidate. In one embodiment, the first terminal 2 uploads the candidate's face image to the employment recruitment website through an uploading interface on the employment recruitment website. In detail, the first terminal 2 acquires the candidate's face image by a camera or from an external device, and uploads the candidate's face image to the employment recruitment website through the uploading interface on the employment recruitment website.

In one embodiment, the determination by the first acquiring module 401 as to whether the face image is eligible, and determining that the eligible face image can be used as the verification image includes detecting whether a proportion of the face in the face image occupying a total area of the face image reaches a preset proportional value, detecting whether a clarity of the face image reaches a preset clarity, detecting whether a brightness of the face image reaches a preset brightness, detecting whether a face angle in the face image is face-on or tilted, detecting whether a face in the face image is smiling, and detecting whether eyes in the face image are closed. The determination of the face image serving as the verification image is based on the proportion of the face in the face image occupying the total area of the face image reaching the preset proportional value, and/or the clarity of the face image reaching the preset clarity, and/or the brightness of the face image reaching the preset brightness, and/or the face angle in the face image being face-on and in full view rather than tilted away, and/or the face in the face image being smiling; and/or the eyes in the face image being closed. In this embodiment, in the detection of whether the clarity of the face image reaches the preset clarity, the face image can be transformed by a Fourier Transform to obtain a high-frequency component of the face image, which is used to determine whether the clarity of the face image reached the preset clarity. In one embodiment, the first acquiring module 401 determines that the eligible face image can be used as the verification image and the verification image is stored.

The second acquiring module 402 acquires the candidate's data from a third-party website according to the candidate's name and the candidate's face image.

In one embodiment, the second acquiring module 402 queries a third-party website according to the candidate's name and the candidate's face image, and acquires the candidate's data by visiting an API interface of the third-party website. In one embodiment, the third-party website may be a social networking site or a corporate human resources site, for example, the social networking site may be WWECHAT, or FACEBOOK, and the corporate human resources sites may be a banking, or other corporate human resources website. In another embodiment, the second acquiring module 402 queries the third-party website according to the candidate's name and the candidate's face image, and acquires the candidate's data by a network crawler.

The first determining module 403 analyzes the candidate's data by a semantic analysis method to identify the human resources information of the candidate.

In one embodiment, the first determining module 403 matches the candidate's data with a local thesaurus, and splits the candidate's data according to matching results. The human resources information of the candidate is identified according to the matching of the candidate's data. In one embodiment, the local thesaurus includes a number of terms related to the candidate's data. The terms include, but is not limited to, common words collected from the Internet to describe human resources information, and common words used to describe human resources information obtained from the content of user's message history on the Internet. In one embodiment, the first determining module 403 splits the candidate's data from the first word of the candidate's data to the end word of the candidate's data to determine a number of phrases formed by one or more words of the candidate's data, determines whether the phrases match with terms of the local thesaurus, and determines the phrases matching with terms of the local thesaurus as the human resources information of the candidate. In one embodiment, the human resources information of the candidate includes candidate's resume data and message or postings data. In one embodiment, the first determining module 403 displays the human resources information of the candidate on the employment recruitment website for the candidate to confirm and modify the human resources information.

The second determining module 404 analyzes speech data in the human resources information of the candidate to determine candidate's personality by a semantic analysis algorithm.

In one embodiment, the second determining module 404 analyzes the speech data in the human resources information of the candidate to determine candidate's personality by a linear regression algorithm or a decision tree algorithm.

The authorization module 405 acquires a first face image of the candidate by a first camera, compares the first face image with the verification image, and grants the candidate a right to pass through the security station when the first face image is consistent with the verification image.

In one embodiment, the first camera is set on the second terminal 3. The authorization module 405 acquires the first face image of the candidate from the first camera of the second terminal 3, compares the first face image with the verification image, and grants the candidate the right to pass through the security station when the first face image is consistent with the verification image. Thus, an authentication mechanism for protecting personal privacy and an authentication mechanism for allowing people's access to the enterprise are compatible, simplifying the process of employment recruitment.

The analyzing module 406 acquires a second face image of the candidate by a second camera, analyzes the second face image of the candidate by a computer vision algorithm to determine a micro-expression of the candidate.

In one embodiment, the second camera is set on the third terminal 4, and the analyzing module 406 acquires the second face image of the candidate from the second camera of the third terminal 4. In one embodiment, the analyzing module 406 captures a face portion of the second face image by the computer vision algorithm, indicates key points in the face portion, determines a change of the micro-expression of the candidate by the key points in the face portion, and determines the micro-expression of the candidate according to the change of the micro-expression of the candidate. In one embodiment, the computer vision algorithm can be a linear discrimination analysis algorithm, an independent component analysis algorithm, or a hidden Markov algorithm.

The providing module 407 provides the candidate's human resources information, the candidate's personality, and the candidate's micro-expression to the recruiter to evaluate the candidate.

In one embodiment, the providing module 407 analyzes the candidate's images in the candidate's data to get a candidate's behavioral analysis result, and provides the candidate's behavioral analysis result to the recruiter to evaluate the candidate. For example, the providing module 407 analyzes the candidate's images in the candidate's data by the computer visual algorithm to determine whether the candidate is apparently subject to alcoholism, substance abuse, or other abnormal behaviors, and provides the results to the recruiter.

Figure 4:
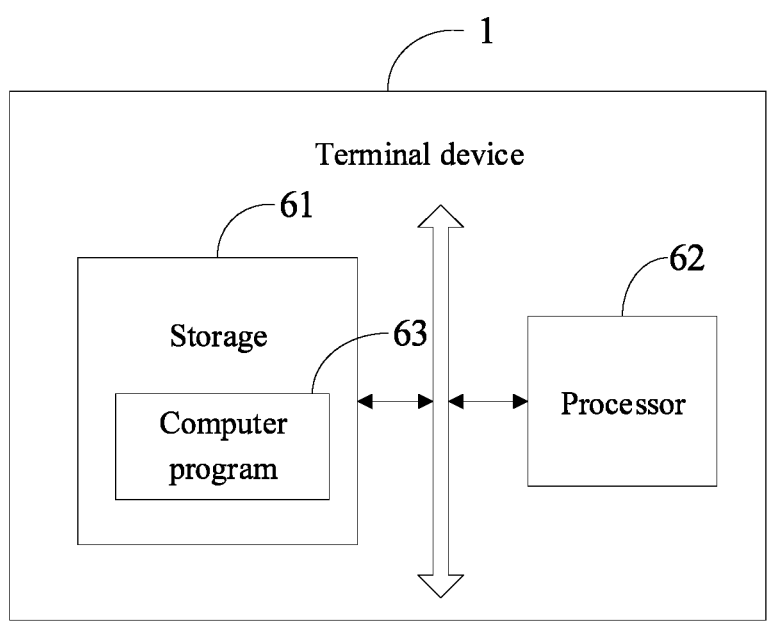
FIG. 4 is a schematic diagram of one embodiment of a terminal device in the method of FIG. 1.

FIG. 4 illustrates the terminal device 1. The terminal device 1 includes a storage 61, a processor 62, and a computer program 63 stored in the storage 61 and executed by the processor 62. When the processor 62 executes the computer program 63, the steps in the embodiment of the employment recruitment method based on face recognition is implemented, for example, steps in blocks 21 to 27 as shown in FIG. 2. Alternatively, when the processor 62 executes the computer program 63, the functions of the modules in the embodiment of the employment recruitment system 40 based on face recognition are implemented, for example, modules 401-407 shown in FIG. 3.

In one embodiment, the computer program 63 can be partitioned into one or more modules/units that are stored in the memory 61 and executed by the processor 62. The one or more modules/units may be a series of computer program instruction segments capable of performing a particular function, and the instruction segments describe the execution of the computer program 63 in the terminal device 1. For example, the computer program 63 can be divided into the first acquiring module 401, the second acquiring module 402, the first determining module 403, the second determining module 404, the authorization module 405, the analyzing module 406, and the providing module 407 as shown in FIG. 3.

FIG. 4 shows only one example of the terminal device 1, no limitations of the terminal device 1 are constituted, and other examples may include more or less components than those illustrated, or some components can be combined, or have a different arrangement. The components, such as the terminal device 1, may also include input devices, output devices, communication unit, network access devices, buses, and the like.

The processor 62 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The general purpose processor may be a microprocessor or the processor may be any conventional processor or the like. The processor 62 is the control center of the terminal device 1, and connects the entire terminal device 1 by using various interfaces and lines.

The storage 61 stores data and programs of the terminal device 1. For example, the storage 61 can store the employment recruitment system 40, preset face images, and preset voices. In at least one exemplary embodiment, the storage 61 can include various types of non-transitory computer-readable storage mediums. For example, the storage 61 can be an internal storage system, such as a flash memory, a random access memory for temporary storage of information, and/or a read-only memory for permanent storage of information. The storage 61 can also be an external storage system, such as a hard disk, a storage card, or a data storage medium.

In one embodiment, the modules/units integrated in the terminal device 1 can be stored in a computer readable storage medium if such modules/units are implemented in the form of a standalone product. Thus, the present disclosure may be implemented and realized in any or part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file or some intermediate form. The computer readable medium may include any entity or device capable of carrying the computer program code, a recording medium, a USB flash drive, a removable hard disk, a magnetic disk, an optical disk, a computer memory, a rad-only memory (ROM), random access memory (RAM), electrical carrier signals, telecommunication signals, and software distribution media.

The embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A terminal device comprising:
a processor; and
a non-transitory storage medium coupled to the processor and configured to store a plurality of instructions, which cause the terminal device to:
acquire a candidate's name and a candidate's face image of a candidate uploaded by the candidate corresponding to the candidate's name as a verification image forverifying an identity of the candidate;

determine the candidate's face image is eligible by both
(i) detecting a clarity of the candidate's face image reaching a preset clarity by transforming the candidate's face image using a fourier transform to obtain a high-frequency component of the candidate's face image, and (ii) one or more of:
detecting a proportion of the candidate's face in the candidate's face image occupying a total area of the candidate's face image reaches a preset proportional value,
detecting a brightness of the candidate's face image reaches a preset brightness,
detecting a face angle in the candidate's face image is face-on and in full view and not tilted away;
in response to determining that the candidate's face image is eligible, use the candidate's face image as the verification image;
acquire candidate's data from a third-party website according to the candidate's name and the candidate's face image;
analyze the candidate's data by a semantic analysis method to identify human resources information of the candidate;
analyze speech data in the human resources information of the candidate to determine candidate's personality by a semantic analysis algorithm;
acquire a first face image of the candidate by a first camera, compare the first face image with the verification image, and grant the candidate a right to pass through a security station at an entrance of an enterprise if the first face image is consistent with the verification image;
acquire a second face image of the candidate by a second camera, analyze the second face image of the candidate by a computer vision algorithm to determine a micro-expression of the candidate; and
provide the human resources information of the candidate, the candidate's personality, and the micro-expression of the candidate to a recruiter to evaluate the candidate.

2. The terminal device as recited in claim 1, wherein the plurality of instructions are further configured to cause the terminal device to:
analyze candidate's images in the candidate's data from the third-party website to obtain a candidate's behavioral analysis result, and provide the candidate's behavioral analysis result to the recruiter to evaluate the candidate.

3. The terminal device as recited in claim 1, wherein the plurality of instructions are further configured to cause the terminal device to:
query the third-party website according to the candidate's name and the candidate's face image, and acquire the candidate's data by visiting an Application Programming Interface of the third-party website.

4. The terminal device as recited in claim 1, wherein the plurality of instructions are further configured to cause the terminal device to:
query the third-party website according to the candidate's name and the candidate's face image, and acquire the candidate's data by a network crawler.

5. The terminal device as recited in claim 1, wherein the plurality of instructions are further configured to cause the terminal device to:
match the candidate's data with a local thesaurus, and split the candidate's data to obtain splitting results of the candidate's data according to a matching result of the candidate's data, and identify human resources information of the candidate according to the splitting results of the candidate's data.

6. An employment recruitment method based on face recognition of a candidate comprising:
acquiring a candidate's name and a candidate's face image of the candidate uploaded by the candidate corresponding to the candidate's name as a verification image for verifying an identity of the candidate;
determine the candidate's face image is eligible by both
(i) detecting a clarity of the candidate's face image reaching a preset clarity by transforming the candidate's face image using a fourier transform to obtain a high-frequency component of the candidate's face image, and (ii) one or more of:
detecting a proportion of the candidate's face in the candidate's face image occupying a total area of the candidate's face image reaches a preset proportional value,
detecting a brightness of the candidate's face image reaches a preset brightness,
detecting a face angle in the candidate's face image is face-on and in full view and not tilted away;
in response to determining that the candidate's face image is eligible, use the candidate's face image as the verification image;
acquiring candidate's data from a third-party website according to the candidate's name and the candidate's face image;
analyzing the candidate's data by a semantic analysis method to identify the human resources information of the candidate;
analyzing speech data in the human resources information of the candidate to determine candidate's personality by a semantic analysis algorithm;
acquiring a first face image of the candidate by a first camera, compare the first face image with the verification image, wherein if the first face image matches the verification image, granting the candidate a right to pass through a security station at an entrance of an enterprise;
acquiring a second face image of the candidate by a second camera, analyze the second face image of the candidate by a computer vision algorithm to determine a micro-expression of the candidate; and
providing the human resources information of the candidate, the candidate's personality, and the micro-expression of the candidate to a recruiter to evaluate the candidate.

7. The employment recruitment method as recited in claim 6, further comprising:
analyzing candidate's images in the candidate's data to obtain a candidate's behavioral analysis result, and providing the candidate's behavioral analysis result to the recruiter to evaluate the candidate.

8. The employment recruitment method as recited in claim 7, further comprising:
querying the third-party website according to the candidate's name and the candidate's face image, and acquiring the candidate's data by visiting an Application Programming Interface of the third-party website.

9. The employment recruitment method as recited in claim 7, further comprising:
querying the third-party website according to the candidate's name and the candidate's face image, and acquiring the candidate's data by a network crawler.

10. The employment recruitment method as recited in claim 7, further comprising:

matching the candidate's data with a local thesaurus, and splitting the candidate's data to obtain splitting results of the candidate's data according to a matching result of the candidate's data, and identifying the human resources information of the candidate according to the splitting results of the candidate's data.

11. A non-transitory storage medium having stored thereon instructions that, when executed by at least one processor of a terminal device, causes the least one processor to execute instructions of an employment recruitment method based on face recognition of a candidate, the employment recruitment method comprising:

acquiring a candidate's name and a candidate's face image of the candidate uploaded by the candidate corresponding to the candidate's name as a verification image for verifying an identity of the candidate;

determine the candidate's face image is eligible by both (i) detecting a clarity of the candidate's face image reaching a preset clarity by transforming the candidate's face image using a fourier transform to obtain a high-frequency component of the candidate's face image, and (ii) one or more of:

detecting a proportion of the candidate's face in the candidate's face image occupying a total area of the candidate's face image reaches a preset proportional value, detecting a brightness of the candidate's face image reaches a preset brightness, detecting a face angle in the candidate's face image is face-on and in full view and not tilted away;

in response to determining that the candidate's face image is eligible, use the candidate's face image as the verification image;

acquiring candidate's data from a third-party website according to the candidate's name and the candidate's face image;

analyzing the candidate's data by a semantic analysis method to identify human resources information of the candidate;

analyzing speech data in the human resources information of the candidate to determine candidate's personality by a semantic analysis algorithm;

acquiring a first face image of the candidate by a first camera, compare the first face image with the verification image, and grant the candidate a right to pass through a security station at an entrance of an enterprise if the first face image is consistent with the verification image;

acquiring a second face image of the candidate by a second camera, analyze the second face image of the candidate by a computer vision algorithm to determine a micro-expression of the candidate; and providing the human resources information of the candidate, the candidate's personality, and the micro-expression of the candidate to a recruiter to evaluate the candidate.

12. The non-transitory storage medium as recited in claim 11, wherein the employment recruitment method further comprising:

analyzing candidate's images in the candidate's data from the third-party website to obtain a candidate's behavioral analysis result, and providing the candidate's behavioral analysis result to the recruiter to evaluate the candidate.

13. The non-transitory storage medium as recited in claim 11, wherein the employment recruitment method further comprising:

querying the third-party website according to the candidate's name and the candidate's face image, and acquiring the candidate's data by visiting an Application Programming Interface of the third-party website.

14. The non-transitory storage medium as recited in claim 11, wherein the employment recruitment method further comprising:

querying the third-party website according to the candidate's name and the candidate's face image, and acquiring the candidate's data by a network crawler.

15. The non-transitory storage medium as recited in claim 11, wherein the employment recruitment method further comprising:

matching the candidate's data with a local thesaurus, and splitting the candidate's data to obtain splitting results of the candidate's data according to a matching result of the candidate's data, and identifying human resources information of the candidate according to the splitting results of the candidate's data.

* * * * *